United States Patent
Kitakaze et al.

(10) Patent No.: US 10,241,493 B2
(45) Date of Patent: *Mar. 26, 2019

(54) CONTROL DEVICE FOR MACHINE TOOL AND MACHINE TOOL INCLUDING THE CONTROL DEVICE

(71) Applicants: Citizen Watch Co., Ltd., Tokyo (JP); Citizen Machinery Co., Ltd., Nagano (JP)

(72) Inventors: Ayako Kitakaze, Tokyo (JP); Masahiro Muramatsu, Tokyo (JP); Toshinari Oyama, Tokyo (JP); Kazuhiko Sannomiya, Nagano (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 89 days.

This patent is subject to a terminal disclaimer.

(21) Appl. No.: 15/129,242

(22) PCT Filed: Mar. 24, 2015

(86) PCT No.: PCT/JP2015/058826
§ 371 (c)(1),
(2) Date: Sep. 26, 2016

(87) PCT Pub. No.: WO2015/146946
PCT Pub. Date: Oct. 1, 2015

(65) Prior Publication Data
US 2017/0102685 A1    Apr. 13, 2017

(30) Foreign Application Priority Data

Mar. 26, 2014 (JP) ................................ 2014-063600
Mar. 26, 2014 (JP) ................................ 2014-063601
Mar. 26, 2014 (JP) ................................ 2014-063602

(51) Int. Cl.
*B23B 1/00* (2006.01)
*B23B 25/02* (2006.01)
(Continued)

(52) U.S. Cl.
CPC ................ *G05B 19/19* (2013.01); *B23B 1/00* (2013.01); *B23B 25/02* (2013.01);
(Continued)

(58) Field of Classification Search
None
See application file for complete search history.

(56) References Cited

U.S. PATENT DOCUMENTS 5,572,430 A    11/1996    Akasaka et al.
5,911,802 A    6/1999    Kimura et al.
(Continued)

FOREIGN PATENT DOCUMENTS

JP    H2270001 A    11/1990
JP    2002 001568 A    1/2002

OTHER PUBLICATIONS

Sannomiya et al., U.S. Appl. No. 15/129,238, filed Sep. 26, 2016 on Control Device for Machine Tool Including the Control Device.

*Primary Examiner* — Qing Yuan Wu
(74) *Attorney, Agent, or Firm* — Howson & Howson LLP

(57) ABSTRACT

To provide a machine tool and a control device for the machine tool that can smoothly cut a workpiece while segmenting chips by feeding a cutting tool in a feed direction while reciprocally vibrating the cutting tool along the feed direction on the basis of a condition set by a user. The machine tool (100) or the control device (C) includes: a setting unit (C1, C2) for utilizing a number of rotations of relative rotation of a workpiece (W) and the cutting tool, a number of reciprocal vibrations of the cutting tool per rotation of the relative rotation, and a vibration frequency
(Continued)

dependent on a period in which the control device (C) can execute an operating instruction when the workpiece W is machined as parameters and for setting values of two of the parameters to a control section (C1); and a correcting unit (C1) for setting the remaining one of the parameters to a predetermined value and correcting the values of the two of the parameters set by the setting unit on the basis of the value of the remaining one of the parameters.

12 Claims, 10 Drawing Sheets

(51) Int. Cl.
    *B23Q 17/00*         (2006.01)
    *G05B 19/18*         (2006.01)
    *G05B 19/19*         (2006.01)
    *B23Q 15/007*       (2006.01)

(52) U.S. Cl.
    CPC ......... *B23Q 15/0075* (2013.01); *B23Q 17/00* (2013.01); *G05B 19/182* (2013.01); *G05B 2219/49277* (2013.01); *G05B 2219/49382* (2013.01)

(56) References Cited

U.S. PATENT DOCUMENTS

| | | | |
|---|---|---|---|
| 9,975,211 B2 * | 5/2018 | Hariki | ................. B23Q 1/34 |
| 2009/0107308 A1 | 4/2009 | Woody et al. | |
| 2014/0102268 A1 | 4/2014 | Hariki et al. | |

* cited by examiner

FIG.5

| INSTRUCTION PERIOD (s) | VIBRATION FREQUENCY f (Hz) |
|---|---|
| 0.004 × 4 | 62.5 |
| 0.004 × 5 | 50 |
| 0.004 × 6 | 41.666 |
| 0.004 × 7 | 35.714 |
| 0.004 × 8 | 31.25 |
| ⋮ | ⋮ |

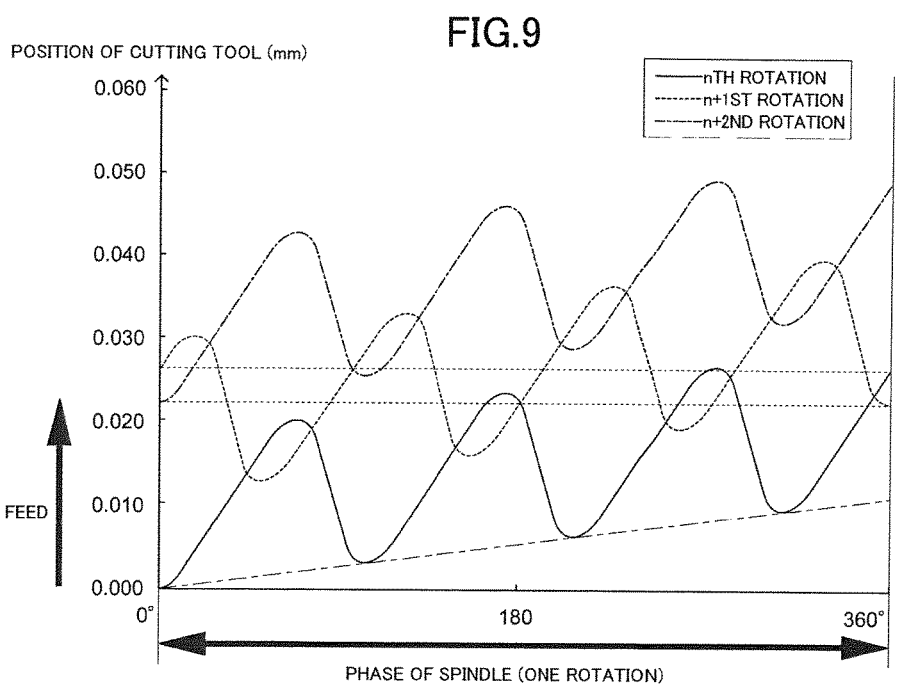

CONTROL DEVICE FOR MACHINE TOOL AND MACHINE TOOL INCLUDING THE CONTROL DEVICE

TECHNICAL FIELD

The present invention relates to a control device for a machine tool that machines a workpiece while sequentially segmenting chips generated during a cutting work, and a machine tool including the control device.

BACKGROUND ART

A conventional machine tool is known that includes a workpiece holding unit for holding a workpiece, a tool post to hold a cutting tool for cutting the workpiece, a feeding unit for feeding the cutting tool to the workpiece in a predetermined feed direction by relatively moving the workpiece holding unit and the tool post, a vibration unit for relatively vibrating the workpiece holding unit and the tool post so that the cutting tool is fed in the feed direction while reciprocally vibrating along the feed direction, and a rotating unit for relatively rotating the workpiece and the cutting tool (see Patent Literature 1, for example).

A control device of this machine tool drives and controls the rotating unit, the feeding unit, and the vibration unit and makes the machine tool machine the workpiece via the relative rotation of the workpiece and the cutting tool and via the feeding of the cutting tool in the feed direction to the workpiece with the reciprocal vibration.

CITATION LIST

Patent Literature

[Patent Literature 1] Japanese Patent No. 5033929 (see paragraph 0049)

SUMMARY OF INVENTION

Technical Problem

In the conventional machine tool, the control device can execute an operating instruction only in a predetermined period.

Thus, vibration frequency at which the workpiece holding unit and the tool post relatively vibrate is limited to a specific value that is dependent on the period in which the control device can execute an operating instruction.

The conventional machine tool, however, does not take into account the vibration frequency. Thus, there is a problem that the reciprocal vibration sometimes cannot be executed under a condition that is based on a number of rotations of the relative rotation and a number of vibrations of the cutting tool toward the workpiece per rotation of the workpiece desired by a user.

Therefore, the object of the present invention, which has been achieved for addressing the above-described problem of the conventional art, is to provide a control device for a machine tool that enables the machine tool to smoothly cut a workpiece while segmenting chips by feeding a cutting tool in a feed direction while reciprocally vibrating the cutting tool along the feed direction on the basis of a condition set by a user, and a machine tool including the control device.

Solution to Problem

According to a first aspect of the present invention, a control device for a machine tool is provided that is disposed in a machine tool having a cutting tool for cutting a workpiece, a rotating unit for relatively rotating the cutting tool and the workpiece, a feeding unit for feeding the cutting tool and the workpiece in a predetermined feed direction, and a vibration unit for relatively reciprocally vibrating the cutting tool and the workpiece. The control device has a control section to make the machine tool machine the workpiece via the relative rotation of the cutting tool and the workpiece and via the feeding of the cutting tool to the workpiece with the reciprocal vibration. The control device includes a setting unit for utilizing a number of rotations of the relative rotation, a number of vibrations of the reciprocal vibration per rotation of the relative rotation, and a vibration frequency dependent on a period in which the control device can execute an operating instruction when the workpiece is machined as parameters and for setting values of two of the parameters to the control section, and a correcting unit for setting the remaining one of the parameters to a predetermined value and correcting the values of the two of the parameters set by the setting unit to predetermined values on the basis of the value of the remaining one of the parameters.

According to a second aspect of the present invention, the vibration unit relatively reciprocally vibrates the cutting tool and the workpiece along the feed direction.

According to a third aspect of the present invention, the vibration unit relatively reciprocally vibrates the cutting tool and the workpiece so that a portion of the workpiece that is cut with the cutting tool in forward movement of the reciprocal vibration overlaps a portion of the workpiece that is cut with the cutting tool in backward movement of the reciprocal vibration.

According to a fourth aspect of the present invention, the correcting unit sets the remaining one of the parameters to a predetermined value and corrects the values of the two of the parameters set by the setting unit so that the number of rotations will be inversely proportional to the number of vibrations with a constant that is based on the vibration frequency.

According to a fifth aspect of the present invention, the two of the parameters whose values are set by the setting unit are the number of rotations and the number of vibrations, and the correcting unit determines the vibration frequency on the basis of a value calculated according to the number of rotations and the number of vibrations set by the setting unit and corrects the value of the number of rotations or the number of vibrations set by the setting unit to a predetermined value on the basis of the vibration frequency determined by the correcting unit.

According to a sixth aspect of the present invention, the correction unit sets an allowable range of the number of vibrations, calculates a value of the number of vibrations on the basis of the number of revolutions set by the setting unit and the vibration frequency determined by the correcting unit, corrects the calculated value of the number of vibrations to a value within the allowable range, and corrects the value of the number of vibrations set by the setting unit to the corrected value.

According to a seventh aspect of the present invention, the correcting unit calculates a value of the number of vibrations on the basis of the number of revolutions set by the setting unit and the vibration frequency determined by the correcting unit, corrects the value of the number of vibrations set by the setting unit to a value that is obtained by adding 0.5 to an integer closest to the calculated value of the number of vibrations, and corrects the value of the number of rotations set by the setting unit to a value calculated from the corrected value of the number of vibrations and the vibration frequency determined by the correcting unit.

According to an eighth aspect of the present invention, the control device includes a speed control unit for setting moving speed of forward movement of the reciprocal vibration of the cutting tool toward the workpiece slower than moving speed of backward movement of the reciprocal vibration of the cutting tool.

According to a ninth aspect of the present invention, a predetermined vibration amplitude of the reciprocal vibration with which machining operation of the workpiece can be executed is preliminarily determined, the control device comprises an amplitude control unit for controlling the reciprocal vibration so that amplitude of the reciprocal vibration gradually increases to the predetermined vibration amplitude at the beginning of the machining operation, and the amplitude control unit sets the amplitude of the reciprocal vibration on the basis of a ratio of the amplitude to the predetermined vibration amplitude, the ratio being calculated by raising a ratio of an elapsed time to a time period needed to reach the predetermined vibration amplitude to a power of a predetermined number.

According to a tenth aspect of the present invention, a machine tool including the control device according to any one of the first to ninth aspects of the present invention is provided.

According to an eleventh aspect of the present invention, the machine tool includes a spindle moving mechanism to move a spindle holding the workpiece in an axial direction and a tool post moving mechanism to move a tool post holding the cutting tool toward the spindle, and the feeding unit includes the spindle moving mechanism and the tool post moving mechanism and feeds the cutting tool to the workpiece via cooperation of the spindle moving mechanism and the tool post moving mechanism.

According to a twelfth aspect of the present invention, a spindle holding the workpiece is fixed on the machine tool, the machine tool includes a tool post moving mechanism to move a tool post holding the cutting tool in multiple directions, and the feeding unit includes the tool post moving mechanism and feeds the cutting tool to the workpiece by moving the tool post in a feed direction toward the spindle positioned in the feed direction.

According to a thirteenth aspect of the present invention, a tool post is fixed on the machine tool, the machine tool includes a spindle moving mechanism to move a spindle holding the workpiece in multiple directions, and the feeding unit includes the spindle moving mechanism and feeds the cutting tool to the workpiece by moving the spindle in a feed direction toward the tool post positioned in the feed direction.

Advantageous Effects of Invention

The control device for a machine tool according to the aspects of the present invention can correct, by the correcting unit, a value of a parameter set by the setting unit to an approximate value of the value of the parameter. Accordingly, the control device can make a machine tool machine a workpiece smoothly while segmenting chips by feeding a cutting tool in the feed direction while reciprocally vibrating the cutting tool along the feed direction under a condition that is relatively close to a condition set by the setting unit.

This enables machining of the workpiece under a condition that is relatively close to a condition that is based on a value of a parameter intended by a user.

Because the control device for a machine tool according to one aspect of the present invention includes the speed control unit for setting moving speed of forward movement of the reciprocal vibration of the cutting tool toward the workpiece slower than moving speed of backward movement of the reciprocal vibration, a load or impact acing on the cutting tool when the cutting tool cuts into the workpiece can be mitigated by making the moving speed of forward movement of the reciprocal vibration slower than that of backward movement of the reciprocal vibration. As a result, shortening of the lifetime of the cutting tool can be prevented, for example.

According to the control device for a machine tool of one aspect of the present invention, a predetermined vibration amplitude of the reciprocal vibration with which machining operation of the workpiece can be executed is preliminarily determined, the control device comprises an amplitude control unit for controlling the reciprocal vibration so that amplitude of the reciprocal vibration gradually increases to the predetermined vibration amplitude at the beginning of the machining operation, and the amplitude control unit sets the amplitude of the reciprocal vibration on the basis of a ratio of the amplitude to the predetermined vibration amplitude, the ratio being calculated by raising a ratio of an elapsed time to a time period needed to reach the predetermined vibration amplitude to a power of a predetermined number. Thus, a control program for gradually increasing the amplitude of the reciprocal vibration of the cutting tool can be easily created by simply writing a formula $y=x^k$.

Also, the machine tool according to one aspect of the present invention can cut a workpiece smoothly while segmenting chips by virtue of the above-described control device for a machine tool.

BRIEF DESCRIPTION OF DRAWINGS

FIG. 5 is a diagram illustrating the relation between an instruction period and a vibration frequency in the first embodiment of the present invention.

FIG. 9 is a diagram illustrating the relation between the nth rotation, the n+1th rotation, and the n+2th rotation of a spindle in the second embodiment of the present invention.

DESCRIPTION OF EMBODIMENTS

An embodiment of the present invention is not restricted to any particular form as long as the embodiment relates to a control device for a machine tool provided in a machine tool having a cutting tool for cutting a workpiece, a rotating unit for relatively rotating the cutting tool and the workpiece, a feeding unit for feeding the cutting tool and the workpiece in a predetermined feed direction, and a vibration unit for relatively reciprocally vibrating the cutting tool and the workpiece, the control device having a control section to make the machine tool machine the workpiece via the relative rotation of the cutting tool and the workpiece and via the feeding of the cutting tool to the workpiece with the reciprocal vibration, wherein the control device comprises: a setting unit for utilizing a number of rotations of the relative rotation, a number of vibrations of the reciprocal vibration per rotation of the relative rotation, and a vibration frequency dependent on a period in which the control device can execute an operating instruction when the workpiece is machined as parameters and for setting values of two of the parameters to the control section, and a correcting unit for setting the remaining one of the parameters to a predetermined value and correcting the values of the two of the parameters set by the setting unit to predetermined values on the basis of the value of the remaining one of the parameters, so that the control device can correct, by the correcting unit, the values of the parameters set by the setting unit and thus can make the machine tool machine the workpiece smoothly while segmenting chips by feeding the cutting tool in the feed direction while reciprocally vibrating the cutting tool along the feed direction under a condition that is relatively close to a condition set by the setting unit.

[First Embodiment]

Figure 1:
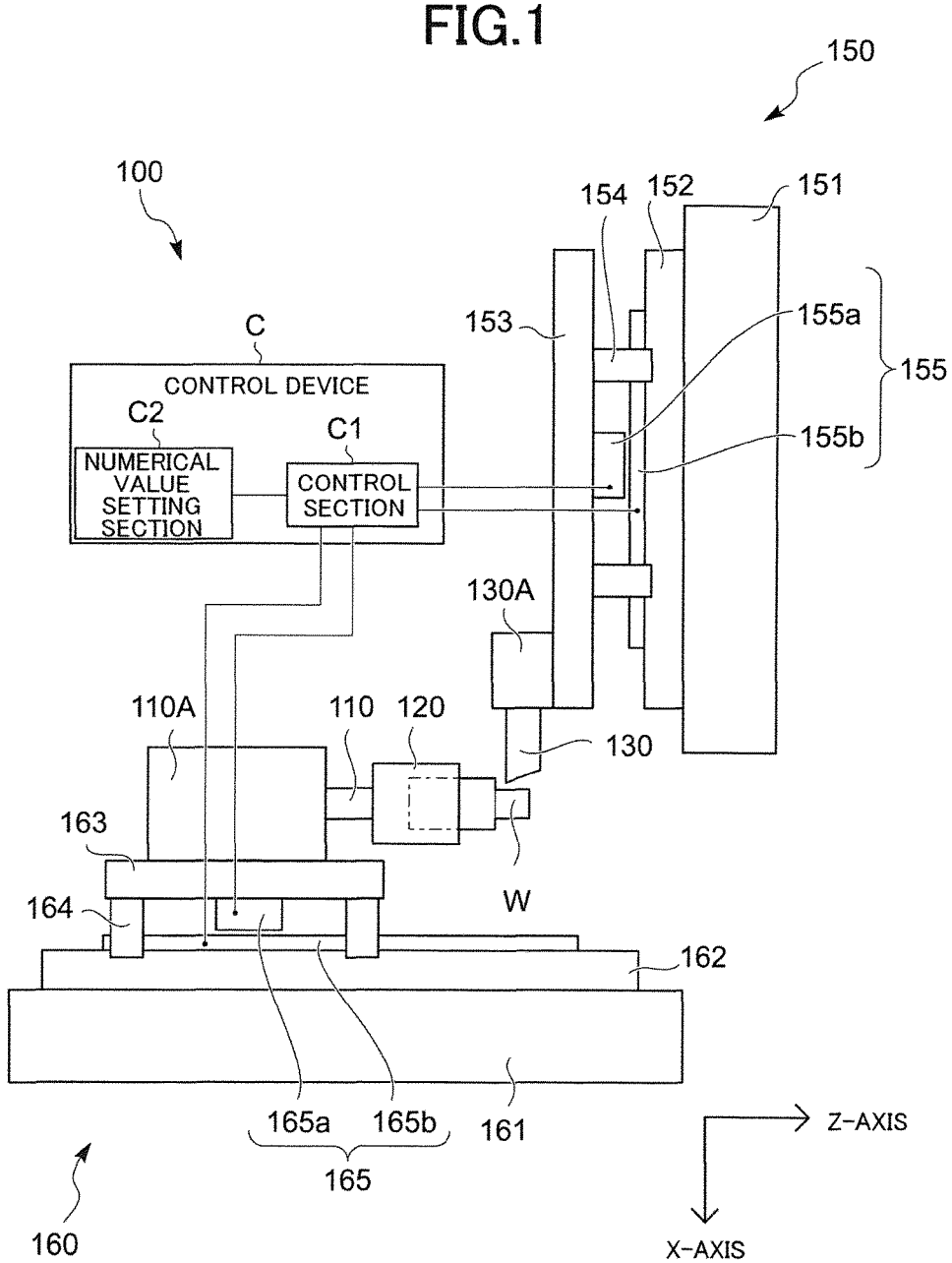
FIG. 1 is a diagram schematically illustrating a machine tool of a first embodiment of the present invention.

FIG. 1 is a diagram schematically illustrating a machine tool 100 including a control device C of a first embodiment of the present invention.

The machine tool 100 includes a spindle 110 and a cutting tool post 130A.

A chuck 120 is provided at a front end of the spindle 110.

A workpiece W is held by the spindle 110 via the chuck 120, and the spindle 110 is configured as a workpiece holding unit for holding a workpiece.

The spindle 110 is supported by a spindle headstock 110A so as to be rotatably driven by a spindle motor that is not illustrated.

As the spindle motor in the spindle headstock 110A, a conventionally known built-in motor formed between the spindle headstock 110A and the spindle 110 is conceivable, for example.

The spindle headstock 110A is mounted on a side of a bed of the machine tool 100 so as to be movable in a Z-axis direction, which is an axial direction of the spindle 110, by a Z-axis direction feeding mechanism 160.

The spindle 110 is moved in the Z-axis direction by the Z-axis direction feeding mechanism 160 via the spindle headstock 110A.

The Z-axis direction feeding mechanism 160 constitutes a spindle moving mechanism to move the spindle 110 in the Z-axis direction.

The Z-axis direction feeding mechanism 160 includes a base 161, which is integrated with a stationary side of the Z-axis direction feeding mechanism 160 including the bed, and a Z-axis direction guide rail 162 provided on the base 161 and extending in the Z-axis direction.

The Z-axis direction guide rail 162 slidably supports a Z-axis direction feeding table 163 via a Z-axis direction guide 164.

A mover 165a of a linear servo motor 165 is provided on a side of the Z-axis direction feeding table 163, and a stator 165b of the linear servo motor 165 is provided on a side of the base 161.

The spindle headstock 110A is mounted on the Z-axis direction feeding table 163, and the Z-axis direction feeding table 163 is moved by the linear servo motor 165 in the Z-axis direction.

Due to the movement of the Z-axis direction feeding table 163, the spindle headstock 110A moves in the Z-axis direction, enabling movement of the spindle 110 in the Z-axis direction.

A cutting tool 130 such as a tool bit for cutting the workpiece W is attached to the cutting tool post 130A.

The cutting tool post 130A constitutes a tool post that holds a cutting tool.

The cutting tool post 130A is provided on the side of the bed of the machine tool 100 so as to be movable in an X-axis direction, which is orthogonal to the Z-axis direction, and a Y-direction, which is orthogonal to the Z-axis direction and the X-axis direction, by virtue of an X-axis direction feeding mechanism 150 and a Y-axis direction feeding mechanism that is not illustrated.

The X-axis direction feeding mechanism 150 and the Y-axis direction feeding mechanism constitute a tool post moving mechanism to move the cutting tool post 130A in the X-axis direction and the Y-axis direction toward the spindle 110.

The X-axis direction feeding mechanism 150 includes a base 151, which is integrated with a stationary side of the X-axis direction feeding mechanism 150, and an X-axis direction guide rail 152 provided on the base 151 and extending in the X-axis direction.

The X-axis direction guide rail 152 slidably supports an X-axis direction feeding table 153 via an X-axis direction guide 154.

A mover 155a of a linear servo motor 155 is provided on a side of the X-axis direction feeding table 153, and a stator 155b of the linear servo motor 155 is provided on a side of the base 151.

The X-axis direction feeding table 153 is moved by the linear servo motor 155 in the X-axis direction.

The Y-axis direction feeding mechanism has the same configuration as the X-axis direction feeding mechanism 150 except being arranged in the Y-axis direction, and is thus not illustrated and described herein in detail.

In FIG. 1, the X-axis direction feeding mechanism 150 is mounted on the side of the bed via the Y-axis direction feeding mechanism that is not illustrated, and the cutting tool post 130A is mounted on the X-axis direction feeding table 153.

The cutting tool post 130A is moved in the X-axis direction by the X-axis direction feeding table 153 and is moved in the Y-axis direction by the Y-axis direction feeding mechanism, which operates in the Y-axis direction in a similar manner to the X-axis direction feeding mechanism 150.

Alternatively, the Y-axis direction feeding mechanism not illustrated herein may be mounted on the side of the bed via the X-axis direction feeding mechanism 150, and the cutting tool post 130A may be mounted on a side of the Y-axis direction feeding mechanism. The configuration for moving the cutting tool post 130A in the X-axis direction and the Y-axis direction via the X-axis direction feeding mechanism 150 and the Y-axis direction feeding mechanism is conventionally known and is thus not described and illustrated herein in detail.

The tool post moving mechanism (the X-axis direction feeding mechanism 150 and the Y-axis direction feeding mechanism) and the spindle moving mechanism (the Z-axis direction feeding mechanism 160) cooperate to feed the cutting tool 130 attached to the cutting tool post 130A in any feed direction with respect to the workpiece W via movement of the cutting tool post 130 in the X-axis direction and the Y-axis direction by the X-axis direction feeding mechanism 150 and the Y-axis direction feeding mechanism and via movement of the spindle headstock 110A (the spindle 110) in the Z-axis direction by the Z-axis direction feeding mechanism 160.

Figure 2:
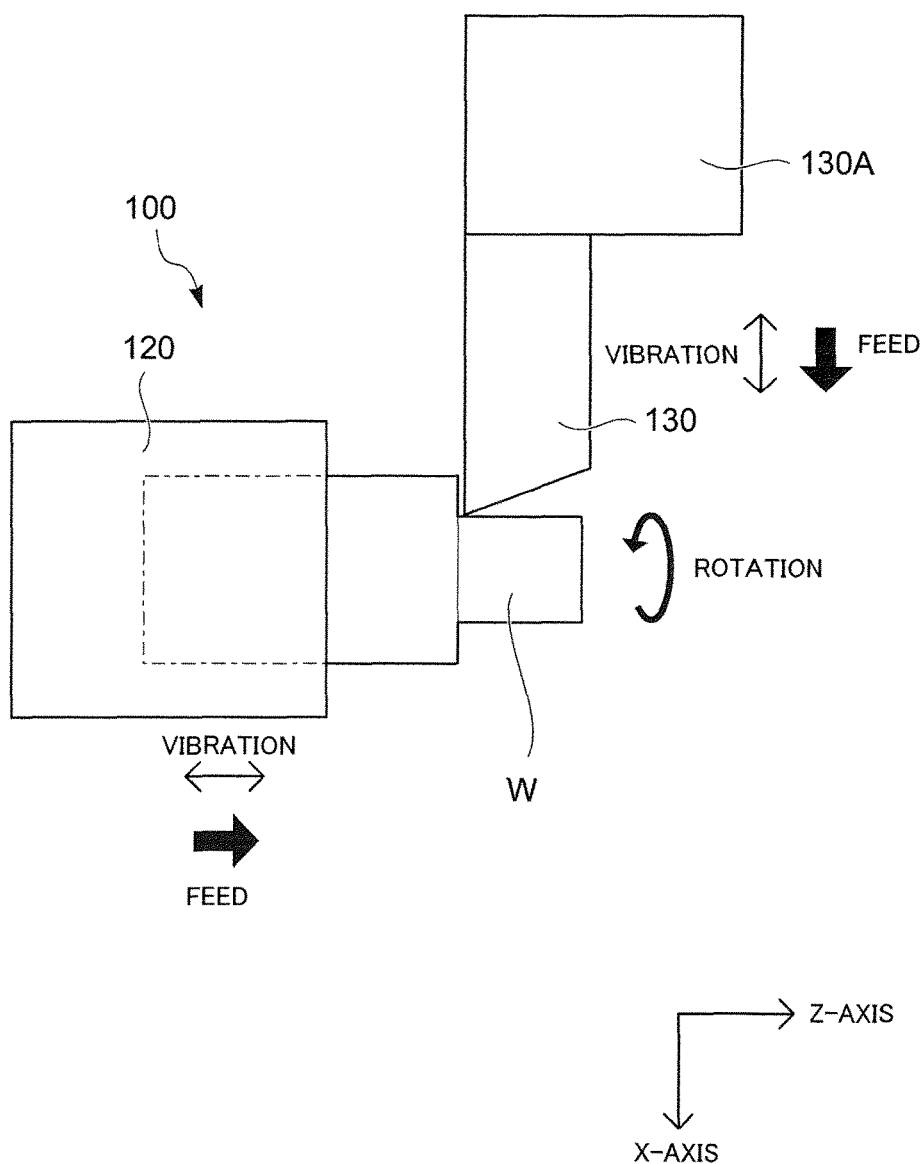
FIG. 2 is a schematic diagram illustrating the relation between a cutting tool and a workpiece in the first embodiment of the present invention.

Due to the feeding of cutting tool 130 in any feed direction with respect to the workpiece W by a feeding unit including the spindle moving mechanism (the Z-axis direction feeding mechanism 160) and the tool post moving mechanism (the X-axis direction feeding mechanism 150 and the Y-axis direction feeding mechanism), the workpiece W is cut into any shape by the cutting tool 130 as illustrated in FIG. 2.

In the present embodiment, both the spindle headstock 110A and the cutting tool post 130A are configured as movable. Alternatively, the spindle headstock 110A may be immovably fixed on the side of the bed of the machine tool 100, and the tool post moving mechanism may be configured to move the cutting tool post 130A in the X-axis direction, the Y-axis direction, and the Z-axis direction.

In this case, the feeding unit includes a tool post moving mechanism that moves the cutting tool post 130A in the X-axis direction, the Y-axis direction, and the Z-axis direction. By moving the cutting tool post 130A with respect to the spindle 110 rotated at a fixed position, the cutting tool 130 can be fed to the workpiece W.

Alternatively, the cutting tool post 130A may be immovably fixed on the side of the bed of the machine tool 100, and the spindle moving mechanism may be configured to move the spindle headstock 110A in the X-axis direction, the Y-axis direction, and the Z-axis direction.

In this case, the feeding unit includes a spindle headstock moving mechanism that moves the spindle headstock 110A in the X-axis direction, the Y-axis direction, and the Z-axis direction. By moving the spindle headstock 110A with respect to the cutting tool post 130A located at a fixed position, the cutting tool 130 can be fed to the workpiece W.

Although in the present embodiment the X-axis direction feeding mechanism 150, the Y-axis direction feeding mechanism, and the Z-axis direction feeding mechanism 160 are configured to be moved by a linear servo motor, they may be moved by a conventional ball screw and a servo motor.

In the present embodiment, the spindle motor such as the built-in motor constitutes a rotating unit for relatively rotating the workpiece W and the cutting tool 130, and the relative rotation of the workpiece W and the cutting tool 130 is achieved by rotation of the spindle 110.

In the present embodiment, the workpiece W is rotated with respect to the cutting tool 130. Alternatively, the cutting tool 130 may be rotated with respect to the workpiece W.

In this case, a rotary tool such as a drill may be used as the cutting tool 130. The spindle 110, the Z-axis direction feeding mechanism 160, the X-axis direction feeding mechanism 150, and the Y-axis direction feeding mechanism are driven and controlled by a control section C1 of the control device C.

The control section C1 is preliminarily set up to control so that the spindle headstock 110A or the cutting tool post 130A is moved in each moving direction while reciprocally vibrating along the each moving direction by utilizing each feeding mechanism as a vibration unit.

Figure 3:
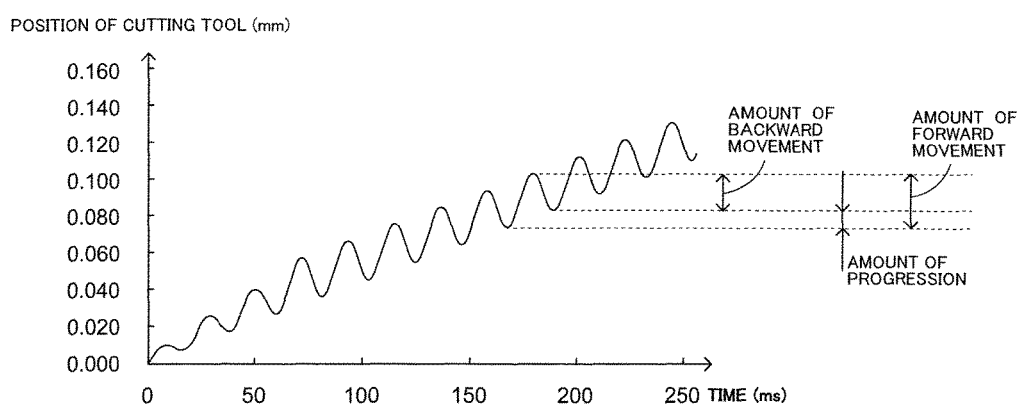
FIG. 3 is a diagram illustrating reciprocal vibration and a position of the cutting tool in the first embodiment of the present invention.

Due to the control by the control section C1, each feeding mechanism moves the spindle 110 or the cutting tool post 130A forward (forward movement) for a predetermined amount of forward movement and then moves it backward (backward movement) for a predetermined amount of backward movement in one reciprocal vibration, so that the spindle 110 or the cutting tool post 130A moves forward for an amount of progression, which is the difference between the amount of forward movement and the amount of backward movement, in each moving direction, as illustrated in FIG. 3. In this manner, the feeding mechanisms cooperatively feed the cutting tool 130 to the workpiece W in the feed direction.

The machine tool 100 machines the workpiece W by moving the cutting tool 130 in the feed direction while reciprocally vibrating the cutting tool 130 along the feed direction by the Z-axis direction feeding mechanism 160, the X-axis direction feeding mechanism 150, and the Y-axis direction feeding mechanism for a feed amount, which is the total of the amount of progression while the spindle rotates one rotation, or while a phase of the spindle changes from 0 to 360 degrees.

Figure 4:
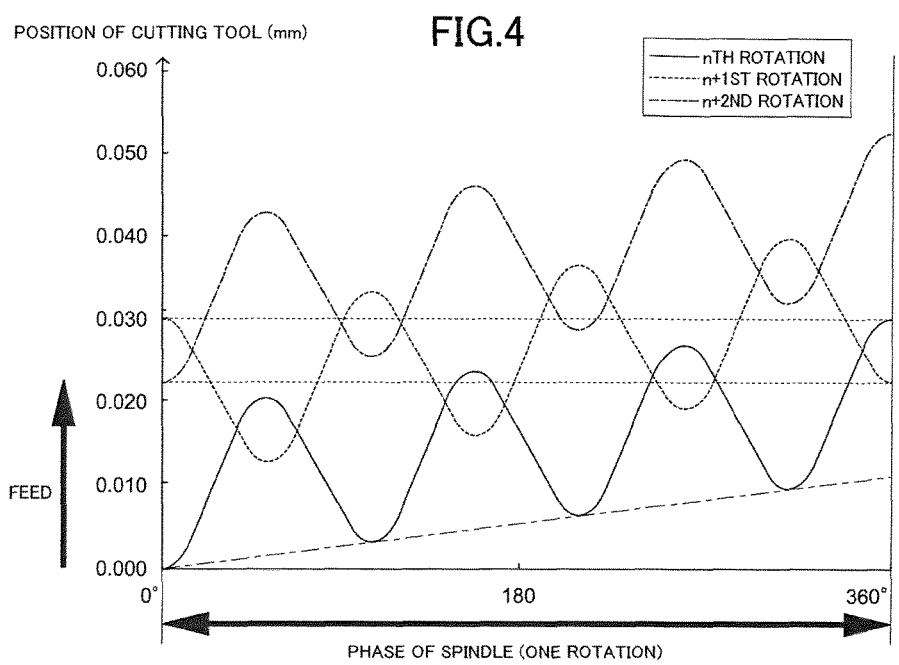
FIG. 4 is a diagram illustrating the relation between the nth rotation, the n+1th rotation, and the n+2th rotation of a spindle in the first embodiment of the present invention.

When the workpiece W is cut into a predetermined shape with the cutting tool 130 by moving the spindle headstock 110A (spindle 110) or the cutting tool post 130A (cutting tool 130) that are reciprocally vibrating while the workpiece W is rotating, a peripheral surface of the workpiece W is cut sinusoidally, as illustrated in FIG. 4.

A virtual line (indicated with a one-dot chain line) that connects the valleys of the sinusoidal waveform indicates the feed amount while the phase of the spindle changes from 0 to 360 degrees.

FIG. 4 illustrates an example in which a number of vibrations N of the spindle headstock 110A (spindle 110) or the cutting tool post 130A per rotation of the workpiece W is 3.5 (N=3.5).

In this case, the phase of the peripheral surface of the workpiece W that is cut with the cutting tool 130 in the n+1th rotation (n is equal to or larger than 1) of the spindle 110 is shifted from the phase of the peripheral surface of the workpiece W that is cut with the cutting tool 130 in the nth rotation of the spindle 110 in a direction indicating the phase of the spindle (the horizontal axis direction of the chart).

Thus, the positions of the shallowest points of the valleys of the phase in the n+1th rotation (the peaks of the ridges of the waveform illustrated with a dotted line in the chart, the peaks indicating the deepest cutting points in the feed direction of the cutting tool 130) are shifted with respect to the positions of the shallowest points of the valleys of the phase in the nth rotation (the peaks of the ridges of the waveform illustrated with a solid line in the chart) in the direction indicating the phase of the spindle.

Thus, a portion of the workpiece W that is cut with the cutting tool 130 in forward movement of the reciprocal vibration partially overlaps a portion of the workpiece W that is cut with the cutting tool 130 in backward movement of the reciprocal vibration. In other words, a portion of the peripheral surface of the workpiece W that is cut with the cutting tool 130 in the n+1th rotation of the workpiece W includes a portion of the peripheral surface of the workpiece W that has been cut in the nth rotation of the workpiece W. In that overlapping portion, the cutting tool 130 performs "aircut", in which the cutting tool 130 does not cut any part of the workpiece W.

Due to the air-cut, chips generated during a cutting work of the workpiece W are sequentially segmented.

The machine tool 100 can thus cut the workpiece W smoothly while segmenting chips by the reciprocal vibration of the cutting tool 130 along the feed direction.

In order to segment chips by the reciprocal vibration of the cutting tool 130, it is enough that a portion of the peripheral surface of the workpiece W that is cut in the n+1th rotation includes a portion of the peripheral surface of the workpiece W that has already been cut in the nth rotation.

In other words, it is enough that the path of the cutting tool in backward movement on the peripheral surface of the workpiece in the n+1 rotation reaches the path of the cutting tool on the peripheral surface of the workpiece in the nth rotation.

The phase of the shape of the workpiece W cut with the cutting tool 130 in the n+1th rotation does not need to be inverted 180 degrees with respect to the phase of the shape of the workpiece W in the nth rotation, as long as these phases are not coincident (synchronized) with each other.

The number of vibrations N may be 1.1, 1.25, 2.6, or 3.75, for example.

Also, the vibration may be set up to be executed less than one time per rotation of the workpiece W (that is, 0<N<1.0).

In this case, the spindle 110 rotates more than one rotation per vibration.

The number of vibrations N may also be set as a number of rotations of the spindle 110 per vibration.

In the machine tool 100, the control section C1 executes an operating instruction in a predetermined instruction period.

The reciprocal vibration of the spindle headstock 110A (spindle 110) or the cutting tool post 130A (cutting tool 130) can be executed in a predetermined frequency that is based on the instruction period.

For example, in case of the machine tool 100 that can send 250 instructions per second by the control section C1, an operating instruction by the control section C1 is executed in a period of 1/250=4 milliseconds (base period).

The instruction period is determined on the basis of the base period, and is usually an integer multiple of the base period.

The reciprocal vibration can be executed in a frequency according to the instruction period.

As illustrated in FIG. 5, suppose that the instruction period is 16 (ms), which is a four-times multiple of the base period (4 (ms)), for example. Then, forward and backward movement of the reciprocal vibration occurs every 16 milliseconds, and the spindle headstock 110A (spindle 110) or the cutting tool post 130A (cutting tool 130) can reciprocally vibrate in a frequency of 1/(0.004×4)=62.5 (Hz).

The spindle headstock 110A (spindle 110) or the cutting tool post 130A (cutting tool 130) may reciprocally vibrate only in one of a plurality of other predetermined sporadic frequencies, such as 1/(0.004×5)=50 (Hz), 1/(0.004×6)= 41.666 (Hz), 1/(0.004×7)=35.714 (Hz), and 1/(0.004×8)= 31.25 (Hz), for example.

The frequency of the reciprocal vibration (vibration frequency) f (Hz) of the spindle headstock 110A (spindle 110) or the cutting tool post 130A (cutting tool 130) is set to one of the above frequencies.

It is noted that, depending on the control device C (control section C1), the instruction period may be set to a multiple other than an integer multiple of the base period (4 ms).

In this case, the vibration frequency may be set to a frequency according to that instruction period.

When the spindle headstock 110A (spindle 110) or the cutting tool post 130A (cutting tool 130) reciprocally vibrates and the number of rotations of the spindle 110 is S (r/min), the number of vibrations N is calculated as $N=f\times 60/S$.

Figure 6:
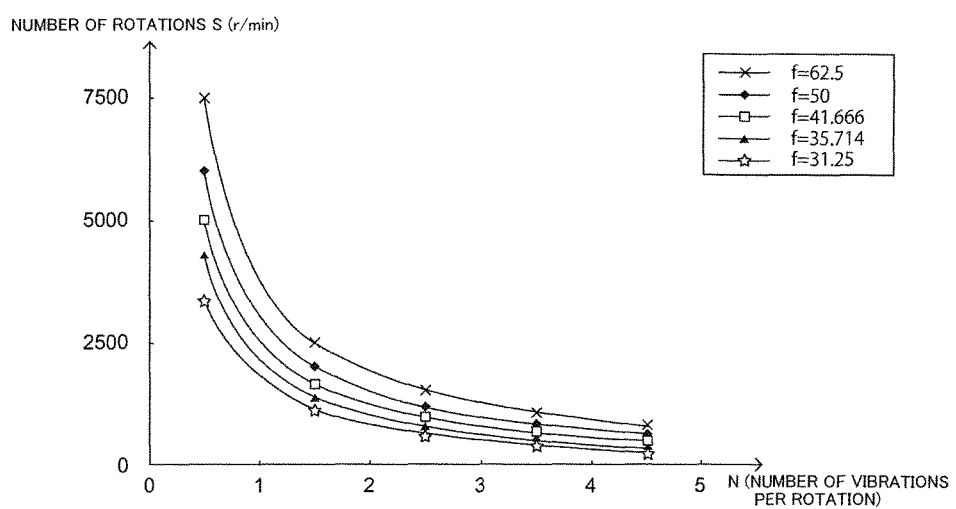
FIG. 6 is a diagram illustrating a relation between a number of vibrations, a number of rotations, and a vibration frequency in the first embodiment of the present invention.

As illustrated in FIG. 6, the number of rotations S is inversely proportional to the number of vibrations N with a constant being the vibration frequency f.

The spindle 110 can rotate faster as the vibration frequency f becomes higher or the number of vibrations N becomes smaller.

The machine tool 100 of the present embodiment is configured such that the number of rotations S, the number of vibrations N, and the vibration frequency f are utilized as parameters and that a user can set two of the three parameters to the control section C1 via a numerical value setting section C2 or the like.

The number of rotations S, the number of vibrations N, or the vibration frequency f can be set to the control section C1 by inputting a value of the number of rotations S, the number of vibrations N, or the vibration frequency f to the control section C1 as a parameter value. Alternatively, a value of the number of rotations S, the number of vibrations N, or the vibration frequency f may be set by writing a value in a machining program, or the number of vibrations N and/or the vibration frequency f may be set in a program block (one line of a program) as an argument, for example.

Particularly, if a setting unit is configured so that the number of vibrations N and/or the vibration frequency f can be set in a program block of a machining program as an argument, a user can easily set any two of the number of rotations S, the number of vibrations N, and the vibration frequency f from the machining program via the number of rotations S of the spindle 110, which is usually written in the machining program, and the number of vibrations N and/or the vibration frequency f, which are/is written as an argument in the program block.

Setting via the setting unit may be executed through a program or by a user via the numerical value setting section C2.

Alternatively, the setting unit may be configured such that a peripheral speed and a diameter of the workpiece may be set and input through a machining program or the like so that the number of rotations S can be calculated and set on the basis of the peripheral speed and the diameter of the workpiece.

By configuring the setting unit to calculate the number of rotation S on the basis of the peripheral speed and the diameter of the workpiece that are set and input via a machining program or the like, the number of rotations S can be easily set on the basis of the peripheral speed determined according to material of the workpiece W or type, shape, or material of the cutting tool 130 without being noticed by a user.

Based on any two of the number of rotations S, the number of vibrations N, and the vibration frequency f that have been set, the control section C1 rotates the spindle 110 at the number of rotations S and moves the spindle 110A or the cutting tool post 130A while reciprocally vibrating the spindle 110A or the cutting tool post 130A so that the cutting tool 130 is fed in the feed direction while reciprocally vibrating along the feed direction at the number of vibrations N.

However, because the number of rotations S and the number of vibrations N are dependent on the vibration frequency f as described above, the control section C1 includes a correcting unit for correcting any two of the number of rotations S, the number of vibrations N, and the vibration frequency f that have been set on the basis of a group f, which is a set of values of the vibration frequency f determined according to a value of the instruction period. The correction is executed by setting a value of one parameter that has not been set to a predetermined value on the basis of values set to the two parameters and correcting the values of the two parameters to predetermined values on the basis of the value set to the one parameter.

It is noted that the correcting unit may not perform the correction if the values set to the two parameters do not require the correction eventually.

Figure 7:
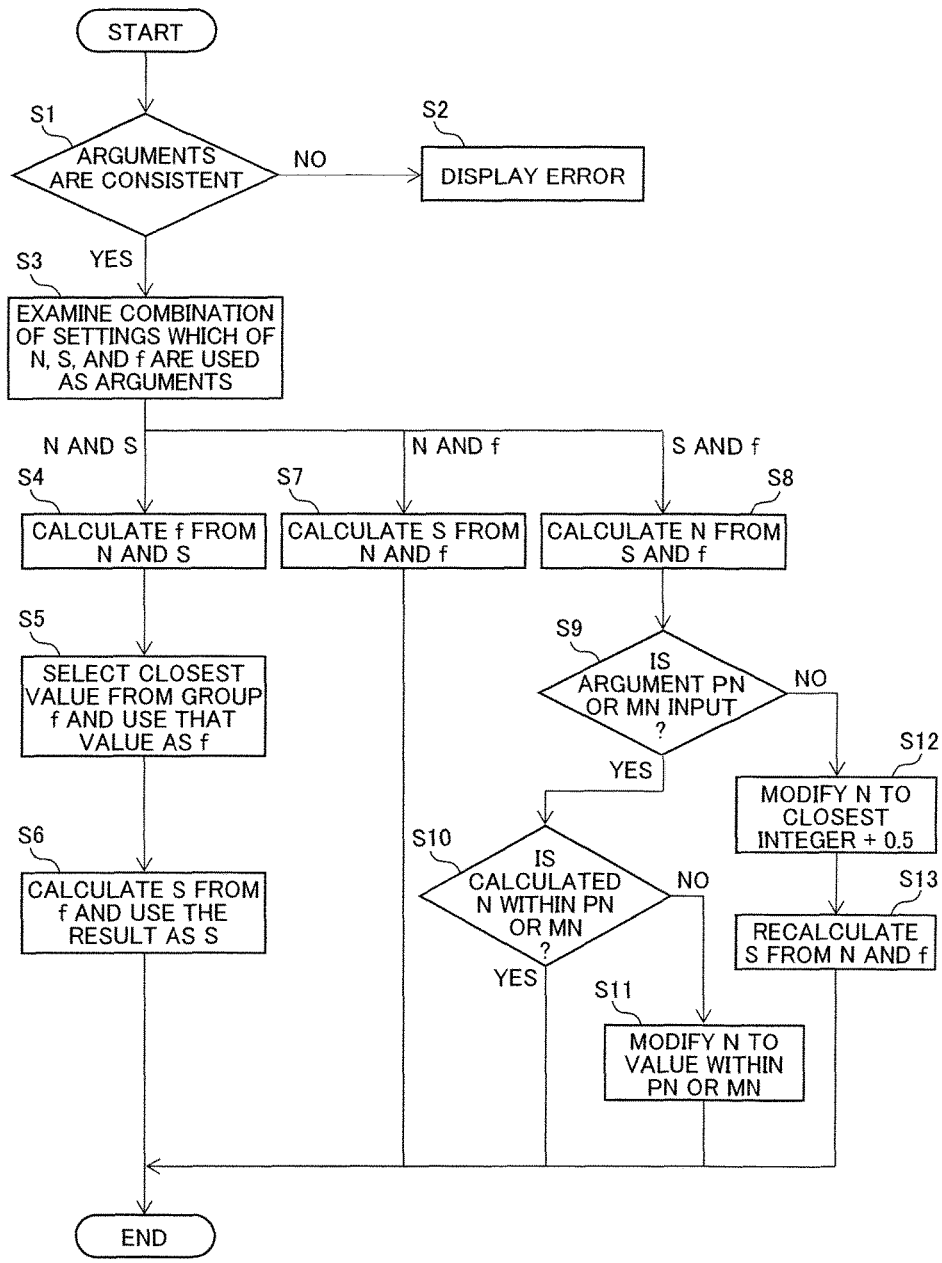
FIG. 7 is a flowchart illustrating how a control section determines an argument in the first embodiment of the present invention.

As illustrated in FIG. 7, when the control section C1 functions as the correcting unit, the control section C1 determines, in step S1, whether the settings by a user via the numerical value setting section C2 or the like are consistent For example, if all three or only one of the number of rotations S, the number of vibrations N, and the vibration frequency f are/is set instead of any two of these three parameters, then the settings are determined as inconsistent.

If the settings are determined as inconsistent, then the process proceeds to step S2 and an error message for a user is displayed on a display unit, which is not illustrated.

On the other hand, if the settings are determined as consistent, then the process proceeds to step S3.

In step S3, the control section C1 examines the combination of the settings.

If the number of vibrations N and the number of rotations S are set, the process proceeds to step S4.

If the number of vibrations N and the vibration frequency f are set, the process proceeds to step S7.

If the number of rotations S and the vibration frequency f are set, the process proceeds to step S8.

In step S4, a value of the vibration frequency f is calculated from the number of vibrations N and the number of revolutions S set by a user. The process then proceeds to step S5.

For example, if N=1.5 and S=3000 (r/min), then the vibration frequency f is calculated as f=N×S/60=75 (Hz).

In step S5, the value of the vibration frequency f calculated in step S4 is compared with values in the group f, and one of the values that is the closest to the value of the vibration frequency f calculated in step S4 (for example, 62.5 (Hz)) is selected. The vibration frequency f is then corrected to this selected value, and the process proceeds to step S6.

In step S6, a value of the number of rotations S of the spindle 110 is calculated from the vibration frequency f corrected in step S5 (that is, 62.5 (Hz), for example) and the number of vibrations N set by a user. The calculated value is then set to the number of rotations S of the spindle 110. In other words, the number of rotations S set by a user is corrected to the calculated value. As one example, a value of the number of rotations S is calculated as S=f×60/N=2500 (r/min). Then, the number of rotations S set by a user to 3000 (r/min) is corrected to 2500 (r/min). On the basis of the number of vibrations N set by a user and the number of rotations S corrected by the correcting unit, the machine tool 100 can cut the workpiece W smoothly while segmenting chips by moving the cutting tool 130 in the feed direction while vibrating the cutting tool 130 along the feed direction by the Z-axis feeding mechanism 160, the X-axis feeding mechanism 150, and the Y-axis feeding mechanism. In some cases, the lifetime of the cutting tool 130 can be extended, for example. Accordingly, it is possible to machine the workpiece W under a condition that is relatively close to a condition that is based on the number of rotations S and the number of vibrations N set by a user.

In step S7, the number of rotations S of the spindle 110 is calculated from the number of vibrations N and the vibration frequency f set by a user.

For example, if N=1.5 and f=62.5 (Hz), then the number of rotations S is calculated as S=f/N×60=2500 (r/min).

In step S8, the number of vibrations N is calculated from the number of rotations S and the vibration frequency f set by a user. The process then proceeds to step S9.

As one example, if S=3000 (r/min) and f=62.5 (Hz), then the number of vibrations N is calculated as N=f/S×60=1.25.

In step S9, it is determined whether a positive allowable range (PN) of the number of vibration N or a negative allowable range (MN) of the number of vibrations N where N=integer n+0.5, is set by a user to the control section C1.

If PN or MN is set, the process proceeds to step S10. If PN or MN is not set, the process proceeds to step S12.

As illustrated in FIG. 4, if N=integer n+0.5, the lowest points of the valleys of the phase of the circumferential shape of the work W cut by the cutting tool 130 in the n+1th rotation (the lowest points of the valleys of the waveform illustrated with a dashed line) are aligned with the highest points of the ridges of the phase of the circumferential shape of the work W cut by the cutting tool 130 in the nth rotation (the peaks of the ridges of the waveform illustrated with a solid line) in the circumferential direction of the workpiece W (the horizontal axis direction of the chart).

In step S10, it is determined whether the value of the number of vibrations N calculated in step S8 (N=1.25) is within the positive allowable range PN or the negative allowable range MN.

If not, then in step S11, the value of the number of vibrations N calculated in step S8 (N=1.25) is set to N', which is within the positive allowable range PN or the negative allowable range MN.

For example, if the number of vibrations calculated in step S8 is 1.25 and the negative allowable range MN is 0.05, the value of the number of vibrations N is set to 1.45 (N'), which is within the negative allowable range 0.05 of N, where N=integer n+0.5=1.50.

In this case, the number of rotations S is corrected to 2586.2 (r/min) on the basis of the vibration frequency f and the number of vibrations N.

In step S12, the value of the number of vibration N calculated in step S8 (N=1.25) is modified to n+0.5, where n is the closest integer to that value. The process then proceeds to step S13.

For example, if the value of the number of vibrations N calculated in step S8 is 1.25, then the number of vibrations is set to N'=1.5.

In step S13, a value of the number of rotations S of the spindle 110 is calculated on the basis of the number of vibrations N (N') set in step S12 and the vibration frequency f set by a user, and the value of the number of rotations S is corrected to S'.

For example, if N'=1.5 and f=62.5 (Hz), the correction is executed as S=f/N'×60=2500 (r/min).

On the basis of the number of rotations S and the number of vibrations N corrected by the correcting unit according to the group f, the machine tool 100 can cut the workpiece W smoothly while segmenting chips by moving the cutting tool 130 in the feed direction while vibrating the cutting tool 130 along the feed direction by the Z-axis feeding mechanism 160, the X-axis feeding mechanism 150, and the Y-axis feeding mechanism. In some cases, the lifetime of the cutting tool 130 can be extended, for example.

Accordingly, it is possible to machine the workpiece W under a condition that is relatively close to a condition that is based on the number of rotations S and the number of vibrations N intended by a user.

When a user sets the vibration frequency f, selecting a higher value for the vibration frequency f enables machining of the workpiece W with a higher value of the number of rotations S of the spindle 110. This contributes to shortening of the machining time and reduction of the negative effect of mechanical vibration on machining accuracy.

By setting the number of vibrations N so that the phase of the shape of the workpiece W cut with the cutting tool 130 in the n+1th rotation is shifted from the phase of the shape of the workpiece W cut with the cutting tool 130 in the nth rotation in a manner rather than the 180-degree inversion as illustrated in FIG. 4, the workpiece W can be sequentially machined while the phases are shifted from each other. This enables to reduce roughness of a machined surface in accordance with a material of the workpiece W and a type, shape, or material of the cutting tool 130.

Thus, it is possible to machine the workpiece W under a condition desired by a user by allowing the user to set any two of the number of rotations S, the number of vibrations N, and the vibration frequency f as needed.

[Second Embodiment]

A second embodiment is common with the first embodiment in many elements. Thus, detailed description of similar points is omitted and description of different points will now be given.

In the second embodiment, the number of vibrations N may be fixed in advance (that is, the number of vibrations N does not needs to be input) and only the number of rotations S may be set by a user, so that the vibration frequency f can be set on the basis of the number of rotations S set by a user and the number of vibrations N fixed in advance and then the number of rotations S or the number of vibrations N can be corrected.

On the other hand, in order to reduce a cycle time of machining, the spindle 110 should be rotated as fast as possible.

To do that, the vibration frequency f needs be set as high as possible. However, it is not easy to set the vibration frequency f to an unnecessarily high value in terms of stability of control, for example.

Thus, the number of rotations S can be made as large as possible by setting the number of vibrations N as small as possible.

In this case, the number of rotations S can be easily increased by configuring the setting unit to set the number of vibrations N on the basis of the number of rotations per vibration of the spindle 110.

The spindle 110 can be rotated in a high speed by setting the number of rotations per vibration of the spindle 110 to equal to or larger than one, causing the number of vibrations N to be set to larger than zero but smaller than one.

However, because the length of segmented chips becomes relatively longer, the number of vibrations N should be set to a value that does not adversely affect the machining.

With the conventional machine tools described in Japanese Patent Publication No. 5039591 and Japanese Patent Publication No. 5139592, a relatively high load or impact may act on a cutting tool when a workpiece is cut via reciprocal vibration of the cutting tool with respect to the workpiece.

Due to this load or impact, the lifetime of the cutting tool may be shortened.

It is thus the object of the second embodiment to provide a control device for a machine tool that can reduce a load or impact acting on a cutting tool when a workpiece is machined to prevent shortening of the lifetime of the cutting tool, and a machine tool including the control device.

Figure 8:
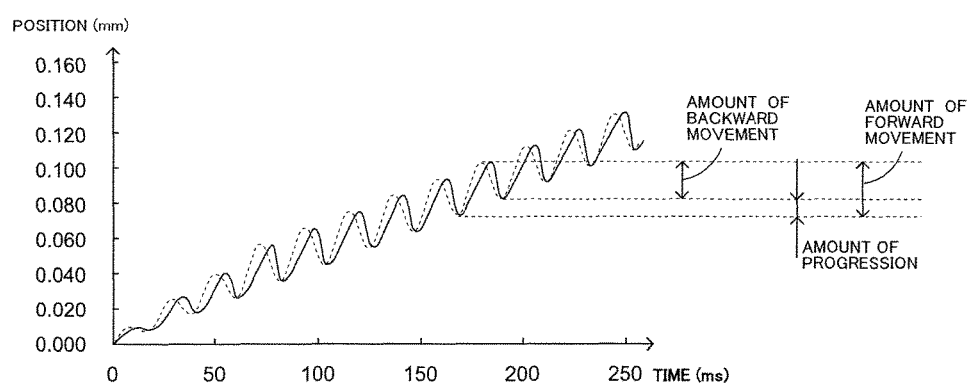
FIG. 8 is a diagram illustrating reciprocal vibration and a position of the cutting tool in a second embodiment of the present invention.

As may be appreciated from the inclination of the lines illustrating forward and backward movement of the reciprocal vibration of the cutting tool 130 in FIGS. 8 and 9, in the second embodiment, the control section C1 working as a speed control unit controls the reciprocal vibration of the cutting tool 130 so that moving speed of forward movement of the reciprocal vibration of the cutting tool 130 toward the workpiece W becomes slower than moving speed of backward movement of the reciprocal vibration of the cutting tool 130.

Thus, compared with the case where the moving speed of forward movement of the reciprocal vibration is the same as the moving speed of backward movement of the reciprocal vibration as illustrated in FIG. 8 with a dotted line, the moving speed of forward movement of the reciprocal vibration becomes slower and a load or impact acting on the cutting tool 130 when the workpiece W is cut is thus reduced.

The dotted line in FIG. 8 illustrates, as a reference, the case where the moving speed of forward movement of the reciprocal vibration is the same as the moving speed of backward movement of the reciprocal vibration Third Embodiment A third embodiment is common with the first and second embodiments in many elements. Thus, detailed description of similar points is omitted and description of different points will now be given.

The conventional machine tools described in Japanese Patent Publication No. 5139591 and Japanese Patent Publication No. 5139592 are configured to gradually increase the amplitude of reciprocal vibration of a cutting tool to a predetermined vibration amplitude when starting a series of cutting operations of a workpiece cutting work (or cutting operations of one process flow).

However, because how the amplitude is specifically increased is not disclosed, it is difficult to change the condition under which the amplitude is increased as need arises.

Thus, it is the object of the third embodiment to provide a control device for a machine tool that simplifies a control program for gradually increasing the amplitude of the reciprocal vibration of a cutting tool to a predetermined vibration amplitude when starting a series of cutting operations of a workpiece cutting work (or cutting operations of one process flow), and a machine tool including the control device.

In the third embodiment, on the basis of the number of vibrations N, a predetermined vibration amplitude of the reciprocal vibration is determined so that a portion of the workpiece W cut by the cutting tool 130 in forward movement of the reciprocal vibration partially overlaps a portion of the workpiece W cut by the cutting tool 130 in backward movement of the reciprocal vibration.

The control section C1 includes an amplitude control unit for controlling the reciprocal vibration of the cutting tool 130 so that the amplitude of the reciprocal vibration of the cutting tool 130 gradually increases to the predetermined vibration amplitude in a predetermined time period when a predetermined machining (one machining process) of the workpiece W is stated.

Due to the amplitude control unit, the amount of forward movement and the amount of backward movement of the cutting tool 130 in an initial few reciprocal vibrations, which occur before the amplitude reaches the predetermined vibration amplitude, become smaller than usual, making the impact at the time of starting a cutting work mitigated.

The amplitude control unit is configured to set the amplitude on the basis of a ratio of the amplitude to a predetermined vibration amplitude y, which is calculated in formula 1 described below, where the base x is a ratio of an elapsed time to the predetermined time period needed to reach the predetermined vibration amplitude from the beginning of a cutting operation, and the power k is a predetermined number.

$$y = X^k \quad \text{(formula 1)}$$

The power k may be an any positive number, because that makes the ratio of the amplitude to the predetermined vibration amplitude y increase as the ratio of an elapsed time to the predetermined time period x increases.

A value of the ratio of an elapsed time to the predetermined time period x and the ratio of the amplitude to the predetermined vibration amplitude y is in a range between 0 and 1. The amplitude at an any given elapsed time is calculated by multiplying the predetermined vibration amplitude by the ratio of the amplitude to the predetermined vibration amplitude y.

Accordingly, the amplitude of the reciprocal vibration can be easily set on the basis of the single parameter k until the amplitude reaches the predetermined vibration amplitude. This enables the amplitude control unit to easily control the reciprocal vibration of the cutting tool 130.

Particularly, if the amplitude control unit is made of a control program that allows the control section C1 to control the reciprocal vibration of the cutting tool 130 until the amplitude reaches the predetermined vibration amplitude, the control program can be easily created by simply writing the formula $y=X^k$, which uses the single parameter k.

Figure 10A:
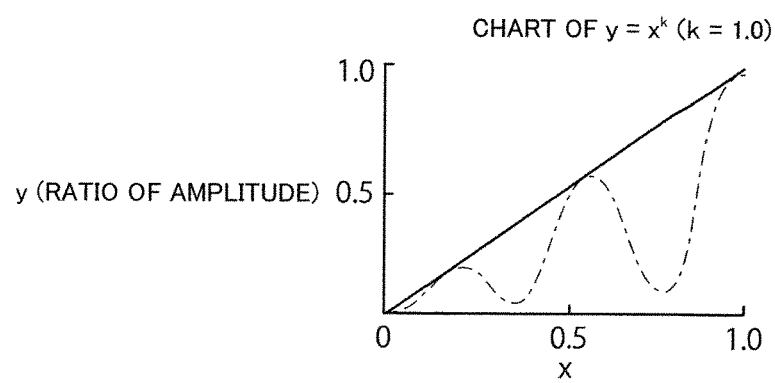
FIG. 10A is a diagram illustrating a ratio of amplitude expressed in a formula $y=x^k$ in a third embodiment.
Figure 10B:
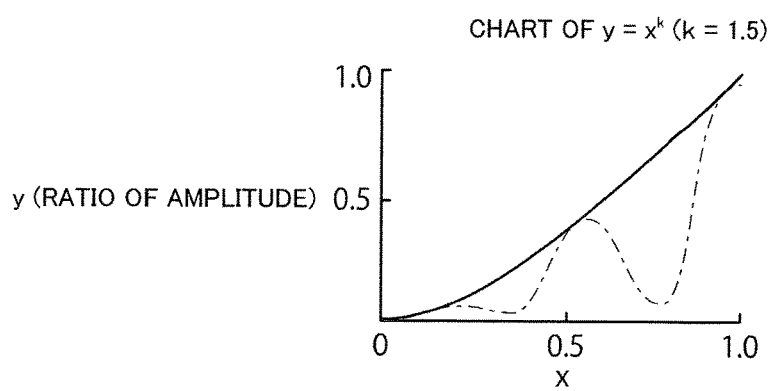
FIG. 10B is a diagram illustrating a ratio of amplitude expressed in a formula $y=x^k$ in the third embodiment.
Figure 10C:
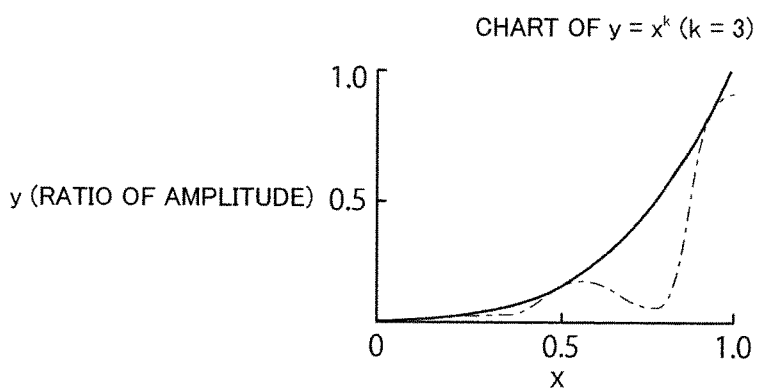
FIG. 10C is a diagram illustrating a ratio of amplitude expressed in a formula $y=x^k$ in the third embodiment.

As illustrated in FIG. 10A, if k is set to one (k=1.0), then y equals x and the amplitude linearly increases to the predetermined vibration amplitude FIG. 10B illustrates the case where k=1.5, and FIG. 10C illustrates the case where k=3.0.

In these cases, the ratio of the amplitude to the predetermined vibration amplitude y increases exponentially as the ratio of an elapsed time to the predetermined time period x increases.

As one example, if k=3.0, the change of the amplitude becomes more apparent in comparison with the case where k=1.5.

As described above, by using the formula $y=X^k$, the amplitude of the reciprocal vibration of the cutting tool 130 can be easily controlled when a cutting operation starts.

REFERENCE SIGNS LIST 100 machine tool
110 spindle
110A spindle headstock
120 chuck
130 cutting tool
130A cutting tool post
150 X-axis direction feeding mechanism
151 base
152 X-axis direction guide rail
153 X-axis direction feeding table
154 X-axis direction guide
155 linear servo motor
155a mover
155b stator
160 Z-axis direction feeding mechanism
161 base
162 Z-axis direction guide rail
163 Z-axis direction feeding table
164 Z-axis direction guide
165 linear servo motor
165a mover
165b stator
C control device
C1 control section
C2 numerical value setting section
W workpiece

The invention claimed is:

1. A machine tool having:
   a cutting tool for cutting a workpiece, a rotating unit for rotating the cutting tool and the workpiece relative to each other;
   a feeding unit for feeding the cutting tool and the workpiece in a predetermined feed direction;
   a vibration unit for reciprocally vibrating the cutting tool and the workpiece relative to each other; and
   a control device having:
      a numerical value setting section configured to set values of two parameters from the group consisting of a number of rotations of the cutting tool and the workpiece relative to each other, a number of vibrations of the reciprocal vibration per rotation of the cutting tool and the workpiece relative to each other, and a vibration frequency dependent on a period in which the control device can execute an operating instruction when the workpiece is machined; and
      a control section for making the machine tool machine the workpiece via rotation of the cutting tool and the workpiece relative to each other, and via the feeding of the cutting tool to the workpiece with reciprocal vibration of the cutting tool and the workpiece relative to each other by the vibration unit, for setting the remaining one of the said parameters to a predetermined value, and for correcting the values of said two of the parameters set by the numerical value setting section in dependence on the value of the remaining one of said parameters.

2. The machine tool according to claim 1, wherein the vibration unit reciprocally vibrates the cutting tool and the workpiece relative to each other along the feed direction.

3. The machine tool according to claim 2, wherein the vibration unit reciprocally vibrates the cutting tool and the workpiece relative to each other so that a portion of the workpiece that is cut with the cutting tool in forward movement of the reciprocal vibration overlaps a portion of the workpiece that is cut with the cutting tool in backward movement of the reciprocal vibration.

4. The machine tool according to claim 1, wherein the control section sets said remaining one of the parameters to a predetermined value and corrects the values of said two parameters so that the number of rotations will be inversely proportional to the number of vibrations with a constant that is based on the vibration frequency.

5. The machine tool according to claim 4, wherein said two parameters are the number of rotations and the number of vibrations, and the control section determines the vibration frequency on the basis of a value calculated according to the number of rotations and the number of vibrations set by the numerical value setting section and corrects the value of the number of rotations or the number of vibrations set by the numerical value setting section to a predetermined value on the basis of the vibration frequency determined by the control section.

6. The machine tool according to claim 5, wherein the numerical value setting section sets an allowable range of the number of vibrations, and wherein the control section calculates a value of the number of vibrations on the basis of the number of rotations set by the numerical value setting section and the vibration frequency determined by the control section, corrects the calculated value of the number of vibrations to a value within the allowable range, and corrects the value of the number of vibrations set by the numerical value setting section to the corrected value.

7. The machine tool according to claim 5, wherein the control section calculates a value of the number of vibrations on the basis of the number of rotations set by the numerical value setting section and the vibration frequency determined by the control section, corrects the value of the number of vibrations set by the numerical value setting section to a value that is obtained by adding 0.5 to an integer closest to the calculated value of the number of vibrations, and corrects the value of the number of rotations set by the numerical value setting section to a value calculated from the corrected value of the number of vibrations and the vibration frequency determined by the control section.

8. The machine tool according claim 1, wherein the control section sets the speed of forward movement in each reciprocal vibration of the cutting tool toward the workpiece to a speed slower than the speed of backward movement in each reciprocal vibration of the cutting tool.

9. The machine tool according to claim 1, wherein
a predetermined vibration amplitude of the reciprocal vibration with which machining operation of the workpiece can be executed is preliminarily determined;
the control section controls said reciprocal vibration so that the amplitude of reciprocal vibration gradually increases to said predetermined vibration amplitude at the beginning of the machining operation; and
said control section sets the amplitude of the reciprocal vibration on the basis of a ratio of the amplitude to the predetermined vibration amplitude, the ratio being calculated by raising a ratio of an elapsed time to a time period needed to reach the predetermined vibration amplitude to a power of a predetermined number.

10. The machine tool according to claim 1, wherein the machine tool comprises: a spindle, a spindle moving mechanism to move the spindle holding the workpiece in an axial direction; and a tool post moving mechanism to move a tool post holding the cutting tool toward the spindle, and the feeding unit includes the spindle moving mechanism and the tool post moving mechanism and feeds the cutting tool to the workpiece via cooperation of the spindle moving mechanism and the tool post moving mechanism.

11. The machine tool according to claim 1, wherein a spindle holding the workpiece is fixed on the machine tool, the machine tool comprises a tool post moving mechanism to move a tool post holding the cutting tool in multiple directions, and the feeding unit includes the tool post moving mechanism and feeds the cutting tool to the workpiece by moving the tool post in a feed direction toward the spindle positioned in the feed direction.

12. The machine tool according to claim 1, wherein a tool post holding the cutting tool is fixed on the machine tool, the machine tool comprises a spindle moving mechanism to move a spindle holding the workpiece in multiple directions, and the feeding unit includes the spindle moving mechanism and feeds the cutting tool to the workpiece by moving the spindle in a feed direction toward the tool post positioned in the feed direction.

* * * * *